Patented Aug. 29, 1933

1,924,934

UNITED STATES PATENT OFFICE 1,924,934

METHOD OF PRODUCING ESTERS OF RESIN ACIDS

Alan C. Johnston, Kenvil, N. J., assignor to Hercules Powder Company, Wilmington, Del., a corporation of Delaware No Drawing. Application April 25, 1930
Serial No. 447,427

24 Claims. (Cl. 260—98)

This invention relates to an improved method for producing esters of resin acids and more particularly relates to a method for producing alkyl esters of abietic acid, as such, or as found in wood and gum resin.

In accordance with this invention alkyl esters of resin acids, as for example, abietic acid, pimaric acid, etc., may be produced through the use of an aliphatic alcohol, as for example, ethyl, amyl, methyl, butyl, propyl, etc. alcohols. Preferably, though not necessarily, the alcohol will be used in the anhydrous form. In proceeding in accordance with the invention a resin acid and an aliphatic alcohol are subjected to treatment under pressure with heat at a suitable temperature, say within about the range 240° C. to 360° C. Generally speaking, while the treatment may be effected at a temperature below the critical temperature of the alcohol used, it will desirably be effected at a temperature above the critical temperature of the alcohol and under certain conditions the treatment may be effected at a temperature substantially above the critical temperature of the alcohol. If desired, during the treatment, alcohol and water of reaction may be bled off.

Practice of the method embodying this invention does not require any particular form of apparatus, and, for example, it may be desirably carried out with the use of an autoclave, if desired, associated with a suitable condenser through which alcohol and water may be bled off.

As illustrative of the practical adaptation of this invention, for example, in the preparation of amyl abietate, 160 g. of resin and 450 g. of amyl alcohol or pentasol are autoclaved at a temperature within about the range 215° C.–225° C. under a pressure of about 150 pounds per square inch, for about fifteen hours. After distilling off the amyl alcohol about 170 g. of crude amyl abietate will be obtained, which may be refined to yield about 100 g. of refined amyl abietate, amounts to a yield of about 62%.

As a further illustration, for example, 200 parts of resin are autoclaved with 400 parts of 99% ethyl alcohol, the temperature being raised to about 360° C. in the course of about 80 minutes and being above 300° C. for about 25 minutes. After the autoclaving period the alcohol is distilled off and a residue amounting to about 203 parts of crude ethyl abietate, acid No. 29, will remain. On distillation of the residue over soda ash about 133 parts of ethyl abietate, pale in color, will be obtained.

As a further example for the production of ethyl abietate, 150 g. of wood resin and 450 g. of ethyl alcohol, preferably anhydrous, having a critical temperature of 243° C. are raised to about 240° C. in the course of about one-half hour and the temperature then held within about the range 240° C.– 265° C. for a period of about twenty-five minutes during which period about 285 g. of alcohol and water of reaction are bled off through a condenser, with the pressure remaining about in the range 900–1050 pounds per square inch. On completion of the treatment the alcohol is distilled off from the autoclave and a residue comprising about 150 g. of crude ethyl abietate will remain. The crude ethyl abietate thus obtained is then refined by distilling over soda ash with a yield of 123 g. of refined ethyl abietate, acid No. 0.8.

As a further illustration, for example, in the preparation of normal butyl abietate, 150 g. of resin and 450 g. of normal butyl alcohol, critical temperature 280° C., are autoclaved for about twenty minutes at a temperature within about the range 280° C.–305° C., after having been brought up to a temperature of about 280° C. in a period of about thirty-five minutes. During the autoclaving about 300 g. of butyl alcohol and part of the water of reaction are bled off, the pressure remaining within about the range 600–650 pounds per square inch. On completion of the autoclaving the alcohol is distilled off and the residue, distilled over soda ash, will yield about 125 g. normal butyl abietate, acid No. 0.6.

As a further illustration, for example, in the preparation of methyl abietate, 150 g. of resin and 450 g. of methyl alcohol, critical temperature 246° C., are autoclaved for about twenty-five minutes at a temperature within about the range 260° C.– 285° C., after having been brought to a temperature of about 260° C. in a period of about fifty minutes. During the autoclaving about 275 g. of methyl alcohol and water of reaction are bled off to maintain a pressure within about the range 1100–1700 pounds. On working up, i. e. distilling off the alcohol and distilling residue over soda ash, about 126 g. of methyl abietate will be obtained.

As a further illustration, for example, in the preparation of amyl abietate, 150 g. of resin, having, for example, acid No. 170 and 450 g. of amyl alcohol or pentasol (mixed amyl alcohols) are autoclaved at a temperature within about the range 270° C.–295° C. after having been raised to a temperature of about 270° C. in a period of about 35 minutes. During the autoclaving about 326 g. of the alcohol and water of reaction are bled off and the pressure maintained within about the ranged 400–500 pounds per square inch. On distilling off the alcohol and distilling the residue over soda ash about 116 g. of amyl abietate, acid No. 1.3, will be obtained.

As a further illustration, for example, in the preparation of normal propyl abietate, 150 g. of wood resin, grading G in color, and 520 g. of N-propyl alcohol are autoclaved at 260° C. to 280° C. for 15 minutes under a pressure of 650–750 pounds, with the bleeding off of 315 g. of alcohol and water of reaction. On distilling off the alcohol and distilling the residue over soda ash, about 115 g. of N-propyl abietate, acid No. 0.3 will be obtained.

As a further ilustration, for example, in the preparation of ethyl abietate, 150 g. of wood resin, grading G in color, and 450 g. of ethyl alcohol (99%) are heated up to 260° C. in the course of 45 minutes. The temperature is then raised from 260° C.–280° C. in 15 minutes, under 850–1200 pounds pressure, while bleeding off 305 g. of alcohol and water which will contain a small amount of resin and ethyl abietate. The crude ethyl abietate taken from the autoclave will have an acid No. of 15.6 and amount to about 138 g. On distillation over soda ash, it will give a yield of refined ethyl abietate.

It will be appreciated that in proceeding in accordance with this invention, while it is desirable that a temperature be at about the critical temperature of the alcohol be used and that alcohol and water of reaction may be bled off, the method may be carried out at temperatures above or somewhat below the critical temperature of the alcohol and without bleeding. If in the carrying out of the method a small amount of resin oil should be formed, it may be removed by fractionating off the low end of the ester.

What I claim and desire to protect by Letters Patent is:

1. The method of producing an alkyl ester of resin, which includes subjecting resin and a monohydric aliphatic alcohol to heat under a pressure of 400–1700 pounds for a period sufficient to effect esterification of the resin.

2. The method of producing an alkyl ester of abietic acid, which includes subjecting abietic acid and a monohydric aliphatic alcohol to heat under a pressure of 400–1700 pounds for a period sufficient to effect esterification of the abietic acid.

3. The method of producing an alkyl ester of resin, which includes subjecting resin and ethyl alcohol to heat under a pressure of 400–1700 pounds for a period sufficient to effect esterification of the resin.

4. The method of producing an alkyl ester of resin, which includes subjecting resin and methyl alcohol to heat under a pressure of 400–1700 pounds for a period sufficient to effect esterification of the resin.

5. On method of producing an alkyl ester of resin, which includes subjecting resin and a monohydric aliphatic alcohol in a closed system to heat at a temperature above the critical temperature of the alcohol and under corresponding pressure resultant from the heating for a period sufficient to effect esterification of the resin.

6. The method of producing an alkyl ester of abietic acid, which includes subjecting abietic acid and a monohydric aliphatic alcohol in a closed system to heat at a temperature above the critical temperature of the alcohol and under corresponding pressure resultant from the heating for a period sufficient to effect esterification of the abietic acid.

7. The method of producing an alkyl ester of abietic acid, which includes subjecting abietic acid and ethyl alcohol in a closed system to heat at a temperature above the critical temperature of the alcohol and under corresponding pressure resultant from the heating for a period sufficient to effect esterification of the abietic acid.

8. The method of producing an alkyl ester of abietic acid, which includes subjecting abietic acid and methyl alcohol in a closed system to heat at a temperature above the critical temperature of the alcohol and under corresponding pressure resultant from the heating for a period sufficient to effect esterification of the abietic acid.

9. The method of producing an alkyl ester of abietic acid, which includes subjecting abietic acid and methyl alcohol to heat under a pressure of 400–1700 pounds for a period sufficient to effect esterification of the abietic acid.

10. The method of producing an alkyl ester of resin, which includes subjecting resin and butyl alcohol to heat under a pressure of 400–1700 pounds for a period sufficient to effect esterification of the resin.

11. The method of producing an alkyl ester of abietic acid, which includes subjecting abietic acid and ethyl alcohol to heat under a pressure of 400–1700 pounds for a period sufficient to effect esterification of the abietic acid.

12. The method of producing an alkyl ester of resin, which includes subjecting resin and aliphatic monohydric alcohol containing less than six carbon atoms to heat under a pressure of 400–1700 pounds for a period sufficient to effect esterification of the resin.

13. The method of producing an alkyl ester of a resin acid, which includes subjecting resin and a monohydric aliphatic alcohol in a closed system to heat at a temperature of about 260° C. to about 360° C. and under a corresponding pressure for a period sufficient to effect esterification of resin acid.

14. The method of producing an alkyl ester of abietic acid, which includes subjecting abietic acid and a monohydric aliphatic alcohol in a closed system to heat at a temperature of about 260° C. to about 360° C. and under a corresponding pressure for a period sufficient to effect esterification of abietic acid.

15. The method of producing an alkyl ester of resin, which includes subjecting resin and a monohydric aliphatic alcohol in a closed system to heat at a temperature of about 260° C. to about 360° C. and under a corresponding pressure for a period sufficient to effect esterification of resin.

16. The method of producing an alkyl ester of abietic acid, which includes subjecting abietic acid and ethyl alcohol in a closed system to heat at a temperature of about 260° C. to about 360° C. and under a corresponding pressure for a period sufficient to effect esterification of abietic acid.

17. The method of producing an alkyl ester of resin, which includes subjecting resin and ethyl alcohol in a closed system to heat at a temperature of about 260° C. to about 360° C. and under a corresponding pressure for a period sufficient to effect esterification of resin.

18. The method of producing an alkyl ester of resin, which includes subjecting resin and a monohydric aliphatic alcohol in a closed system to heat at a temperature of about 260° C. to about 300° C. and under a corresponding pressure for a period sufficient to effect esterification of resin.

19. The method of producing an alkyl ester of abietic acid, which includes subjecting abietic acid and butyl alcohol to heat under a pressure of 400-1700 pounds for a period sufficient to effect esterification of the abietic acid.

20. The method of producing an alkyl ester of abietic acid, which includes subjecting abietic acid and aliphatic monohydric alcohol containing less than six carbon atoms to heat under a pressure of 400-1700 pounds for a period sufficient to effect esterification of the abietic acid.

21. The method of producing an alkyl ester of abietic acid, which includes subjecting abietic acid and butyl alcohol in a closed system to heat at a temperature of about 260° C. to about 360° C. and under a correspondnig pressure for a period sufficient to effect esterification of abietic acid.

22. The method of producing an alkyl ester of abietic acid, which includes subjecting abietic acid and methyl alcohol in a closed system to heat at a temperature of about 260° C. to about 360° C. and under a corresponding pressure for a period sufficient to effect esterification of abietic acid.

23. The method of producing an alkyl ester of resin, which includes subjecting resin and butyl alcohol in a closed system to heat at a temperature of about 260° C. to about 360° C. and under a corresponding pressure for a period sufficient to effect esterification of resin.

24. The method of producing an alkyl ester of resin, which includes subjecting resin and methyl alcohol in a closed system to heat at a temperature of about 260° C. to about 360° C. and under a corresponding pressure for a period sufficient to effect esterification of resin.

ALAN C. JOHNSTON.

CERTIFICATE OF CORRECTION.

Patent No. 1,924,934.     August 29, 1933.

ALAN C. JOHNSTON.

It is hereby certified that error appears in the printed specification of the above numbered patent requiring correction as follows: Page 1, lines 5, 35, 45, 56, 74, 88, and 101, page 2, lines 6, 15, 22, and 35, respectively, for "resin" read rosin; page 2, lines 41, 52, 57, 62, 97, 107, 113, 127, 140, and 146, page 3, lines 82 and 88, claims 1, 3, 4, 5, 10, 12, 13, 15, 17, 18, 23, and 24, respectively, for "resin" both occurrences read rosin; page 2, lines 44, 55, 60, 67, 100, 111, 118, 132, 144, and 150, page 3, line 86, and 92, claims 1, 3, 4, 5, 10, 12, 13, 15, 17, 18, 23, and 24, respectively, for "resin" read rosin; and that the said Letters Patent should be read with these corrections therein that the same may conform to the record of the case in the Patent Office.

Signed and sealed this 21st day of November, A. D. 1933.

F. M. Hopkins (Seal)     Acting Commissioner of Patents.

CERTIFICATE OF CORRECTION.

Patent No. 1,924,934.     August 29, 1933.

ALAN C. JOHNSTON.

It is hereby certified that error appears in the printed specification of the above numbered patent requiring correction as follows: Page 2, line 61, claim 5, for "On" read The; and that the said Letters Patent should be read with this correction therein that the same may conform to the record of the case in the Patent Office.

Signed and sealed this 11th day of September, A. D. 1934.

Leslie Frazer (Seal)     Acting Commissioner of Patents

19. The method of producing an alkyl ester of abietic acid, which includes subjecting abietic acid and butyl alcohol to heat under a pressure of 400-1700 pounds for a period sufficient to effect esterification of the abietic acid.

20. The method of producing an alkyl ester of abietic acid, which includes subjecting abietic acid and aliphatic monohydric alcohol containing less than six carbon atoms to heat under a pressure of 400-1700 pounds for a period sufficient to effect esterification of the abietic acid.

21. The method of producing an alkyl ester of abietic acid, which includes subjecting abietic acid and butyl alcohol in a closed system to heat at a temperature of about 260° C. to about 360° C. and under a correspondnig pressure for a period sufficient to effect esterification of abietic acid.

22. The method of producing an alkyl ester of abietic acid, which includes subjecting abietic acid and methyl alcohol in a closed system to heat at a temperature of about 260° C. to about 360° C. and under a corresponding pressure for a period sufficient to effect esterification of abietic acid.

23. The method of producing an alkyl ester of resin, which includes subjecting resin and butyl alcohol in a closed system to heat at a temperature of about 260° C. to about 360° C. and under a corresponding pressure for a period sufficient to effect esterification of resin.

24. The method of producing an alkyl ester of resin, which includes subjecting resin and methyl alcohol in a closed system to heat at a temperature of about 260° C. to about 360° C. and under a corresponding pressure for a period sufficient to effect esterification of resin.

ALAN C. JOHNSTON.

CERTIFICATE OF CORRECTION.

Patent No. 1,924,934.                                                August 29, 1933.

ALAN C. JOHNSTON.

It is hereby certified that error appears in the printed specification of the above numbered patent requiring correction as follows: Page 1, lines 5, 35, 45, 56, 74, 88, and 101, page 2, lines 6, 15, 22, and 35, respectively, for "resin" read rosin; page 2, lines 41, 52, 57, 62, 97, 107, 113, 127, 140, and 146, page 3, lines 82 and 88, claims 1, 3, 4, 5, 10, 12, 13, 15, 17, 18, 23, and 24, respectively, for "resin" both occurrences read rosin; page 2, lines 44, 55, 60, 67, 100, 111, 118, 132, 144, and 150, page 3, line 86, and 92, claims 1, 3, 4, 5, 10, 12, 13, 15, 17, 18, 23, and 24, respectively, for "resin" read rosin; and that the said Letters Patent should be read with these corrections therein that the same may conform to the record of the case in the Patent Office.

Signed and sealed this 21st day of November, A. D. 1933.

F. M. Hopkins (Seal)                                                Acting Commissioner of Patents.

CERTIFICATE OF CORRECTION.

Patent No. 1,924,934.                                                August 29, 1933.

ALAN C. JOHNSTON.

It is hereby certified that error appears in the printed specification of the above numbered patent requiring correction as follows: Page 2, line 61, claim 5, for "On" read The; and that the said Letters Patent should be read with this correction therein that the same may conform to the record of the case in the Patent Office.

Signed and sealed this 11th day of September, A. D. 1934.

Leslie Frazer (Seal)                                                Acting Commissioner of Patents

CERTIFICATE OF CORRECTION.

Patent No. 1,924,934.                                       August 29, 1933.

ALAN C. JOHNSTON.

It is hereby certified that error appears in the printed specification of the above numbered patent requiring correction as follows: Page 1, lines 5, 35, 45, 56, 74, 88, and 101, page 2, lines 6, 15, 22, and 35, respectively, for "resin" read rosin; page 2, lines 41, 52, 57, 62, 97, 107, 113, 127, 140, and 146, page 3, lines 82 and 88, claims 1, 3, 4, 5, 10, 12, 13, 15, 17, 18, 23, and 24, respectively, for "resin" both occurrences read rosin; page 2, lines 44, 55, 60, 67, 100, 111, 118, 132, 144, and 150, page 3, line 86, and 92, claims 1, 3, 4, 5, 10, 12, 13, 15, 17, 18, 23, and 24, respectively, for "resin" read rosin; and that the said Letters Patent should be read with these corrections therein that the same may conform to the record of the case in the Patent Office.

Signed and sealed this 21st day of November, A. D. 1933.

F. M. Hopkins (Seal)                                              Acting Commissioner of Patents.

CERTIFICATE OF CORRECTION.

Patent No. 1,924,934.  
August 29, 1933.

ALAN C. JOHNSTON.

It is hereby certified that error appears in the printed specification of the above numbered patent requiring correction as follows: Page 2, line 61, claim 5, for "On" read The; and that the said Letters Patent should be read with this correction therein that the same may conform to the record of the case in the Patent Office.

Signed and sealed this 11th day of September, A. D. 1934.

(Seal)

Leslie Frazer  
Acting Commissioner of Patents